April 7, 1953 F. ASHWORTH 2,633,584
STITCHDOWN LASTING MACHINE
Filed Aug. 4, 1950 6 Sheets-Sheet 1

Inventor
Fred Ashworth
By his Attorney

April 7, 1953 F. ASHWORTH 2,633,584
STITCHDOWN LASTING MACHINE
Filed Aug. 4, 1950 6 Sheets-Sheet 2

Inventor:
Fred Ashworth
By his Attorney

April 7, 1953  F. ASHWORTH  2,633,584
STITCHDOWN LASTING MACHINE
Filed Aug. 4, 1950  6 Sheets-Sheet 3

Inventor
Fred Ashworth
By his Attorney

April 7, 1953 F. ASHWORTH 2,633,584
STITCHDOWN LASTING MACHINE
Filed Aug. 4, 1950 6 Sheets-Sheet 4

Inventor
Fred Ashworth
By his Attorney

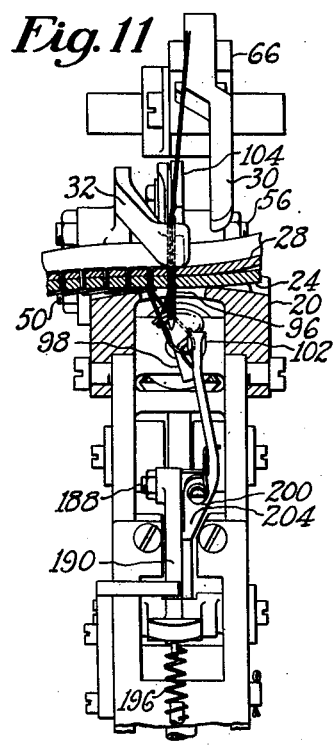
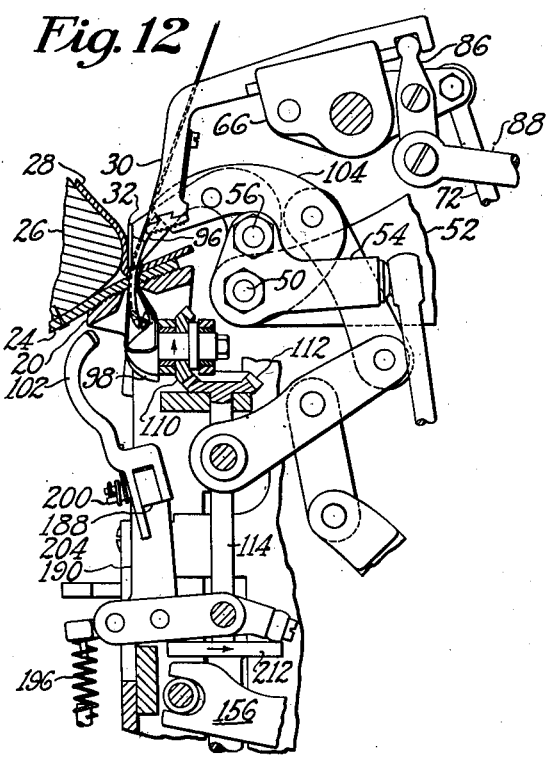
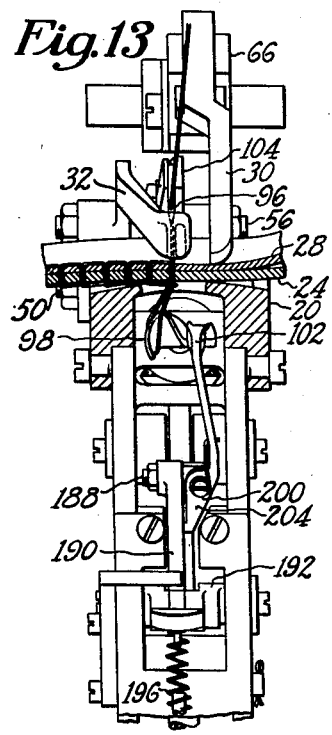
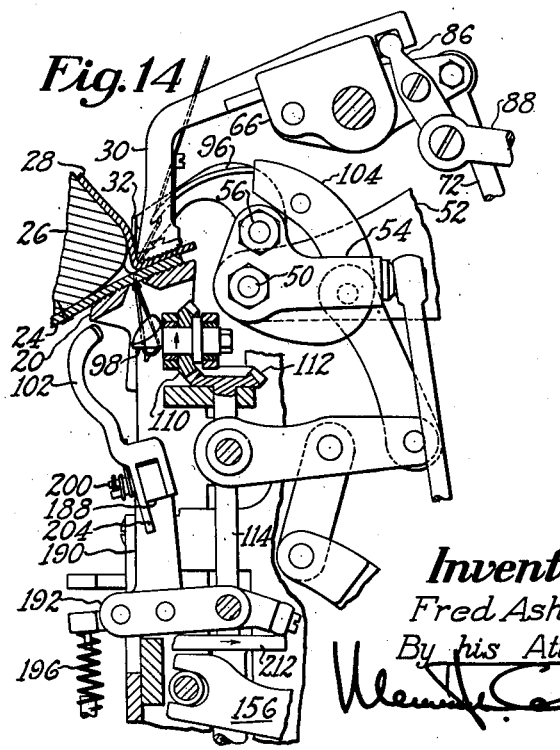

Patented Apr. 7, 1953

2,633,584

UNITED STATES PATENT OFFICE 2,633,584

STITCHDOWN LASTING MACHINE

Fred Ashworth, Wenham, Mass., assignor to United Shoe Machinery Corporation, Flemington, N. J., a corporation of New Jersey Application August 4, 1950, Serial No. 177,644

19 Claims. (Cl. 12—7.7)

The present invention relates to improvements in stitchdown lasting machines of the type disclosed in United States Letters Patent No. 2,502,629, granted April 4, 1950, in the name of Alfred R. Morrill, deceased, in which fastening devices and clamping members are provided comprising a lasting finger and a presser foot acting on the outturned marginal flange of a shoe upper to draw the upper tightly over a last and to secure it in a lasted position to which it is drawn. However, in certain respects the invention is of broader import and is embodied in an entirely new machine based on a fundamentally new principle of lasting and sewing.

In the machine of the patent above referred to, a shoe is presented to the machine in right-sideup relation but inclined downwardly from the machine in order to provide good visibility of the lasting operations and to enable effective control both in positioning the shoe and in correcting faults in the operations as soon as they occur. The lasting finger of the patented machine acts in advance of the point of fastening operations to clamp the outturned upper flange and the extension of the sole of a shoe against a work support. After the lasting finger clamps the upper flange the presser foot forces the upper into an acute angle between the extension sole and the bulging side portion of the last supporting the upper, thereby increasing the tension and the lasting action on the upper.

An important object of the present invention is to provide a novel and improved machine which will apply a still greater tension than heretofore obtainable, uniformly in the upper of a stitchdown shoe while retaining all of the advantages of the prior patented machine. Another object of the invention is to provide a sewing thread lasting machine for stitchdown shoes in which the sewing devices are peculiarly adapted for cooperation with lasting members and by means of which the advantages gained in the improved lasting members will be retained through secure fastenings inserted by the sewing devices. A further object is to enable the use of a rugged and inexpensive construction and arrangement of parts in a sewing or other fastening machine both in the sewing and fastening devices themselves and in the clamping and lasting members for the work operated upon.

In accordance with these and other objects of the invention the features thereof, as hereinafter described and claimed, will readily be apparent from the following detail description taken in connection with the accompanying drawings, in which Fig. 1 is a view in vertical section of the sewing head and a shoe being operated upon by a machine embodying the features of the invention;

Fig. 11 is a front sectional view illustrating the enchainment of one loop of thread in a seam by another after the shoe has been fed a stitch length and a new upper tensioning operation about to be started;

Fig. 12 is a right side sectional elevation in the same positions of the parts;

Fig. 13 is a sectional view in front elevation of the operating parts showing the beginning of a new upper tensioning operation;

Fig. 14 is a right side elevation in the same positions of the parts;

Figure 1:
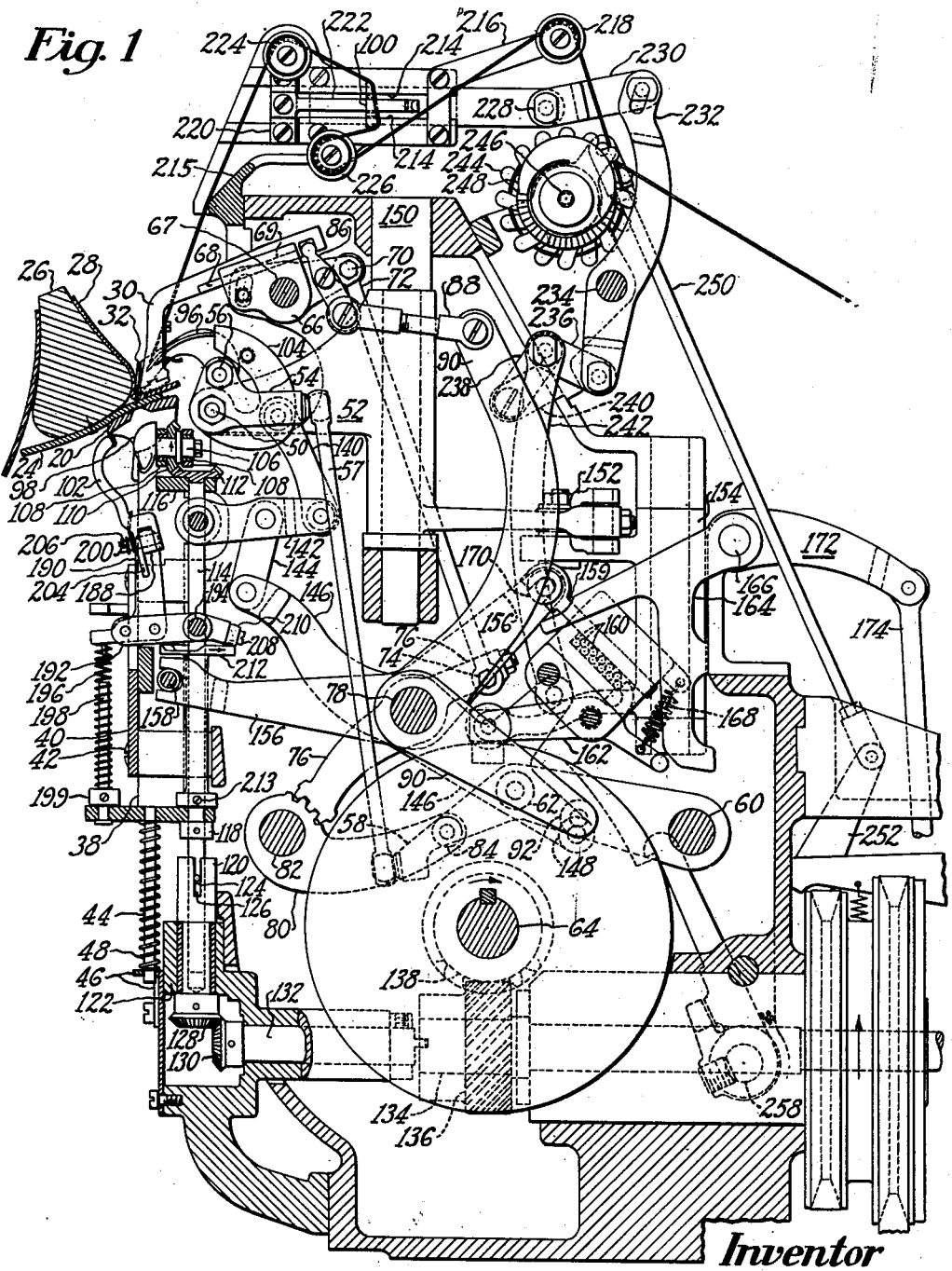

The machine illustrated in the drawings is a stitchdown thread lasting machine similar, except as hereinafter described, to that disclosed in the Morrill patent above identified. The machine is provided with thread fastening devices and upper tensioning and clamping members for operating upon a shoe with the shoe presented to the machine in right-side-up position in which the greatest degree of visibility and convenience in manipulation are obtainable. The fastening devices differ from those disclosed in the patent, above identified, in that those of the prior machine consist of a hook needle instead of an eye-pointed needle, as in the illustrated machine. The stitch forming fastening devices cooperating with the needle of the illustrated machine also are peculiarly fitted for use with an eye-pointed needle and with the particular upper tensioning members employed.

To enable presentation of a shoe in right-side-up position the upper tensioning and clamping members include a work support 20 of substantial width and length along its work engaging surface, which work support is inclined to the path of the needle along that portion engaging the work upwardly from the front of the machine toward the rear with a slight bulging curvature and a series of rearwardly inclined teeth 22 (Figs. 15 and 16) running in the direction of the seam line to assist in retaining a firm grip on an extension sole 24 of a shoe. The sole 24 is temporarily secured to a last 26 about which is disposed an upper 28 to be drawn into lasted relation.

The upper tensioning and clamping members of the prior patented machine include a lasting finger and a presser foot both arranged in line with the seam being inserted to move downwardly in clamping the outturned margin of the upper in such a way that the upper is drawn tightly by the lasting finger to form an angle about the presser foot within a crevice between the extension of the sole 24 and the bulging side of the last 26 on which the upper and sole are mounted. The upper thereafter is forced under tension into more acute an angle within the crevice, the thread fastenings being inserted through the upper and sole along the apex of the angle in the upper. For this purpose, the lasting finger is actuated in the manner disclosed in the patent to engage and clamp the upper in advance of the point of operation of the stitch forming devices and the presser foot. This arrangement presupposes that the upper when engaged by the lasting finger at the beginning of a lasting operation will first be tensioned by the operator in presenting it to the machine, the tension being maintained by the lasting finger in its succeeding points of engagement as the operations progress.

To insure positive application of tension to the outturned margin or flange of a shoe upper engaged by the lasting finger and to relieve the operator of the present machine of the burden of tensioning the upper as a preliminary to presentation of the shoe to the machine, the lasting finger, indicated at 30, is actuated with a positive rearward movement transversely to the line of operation of the stitch forming fastening devices to tension the upper while the presser foot, indicated at 32, engages it, the upper being drawn about the forward end of the presser foot in advance of the needle to take out the fullness before the presser foot is depressed and to force the presser foot more deeply into the angle of the upper. Thereafter, while the lasting finger retains the upper under tension the presser foot is moved a short distance downwardly to force the upper more deeply into the angle between the extension sole and bulging side of the last to increase the tension in the upper.

Figure 15:
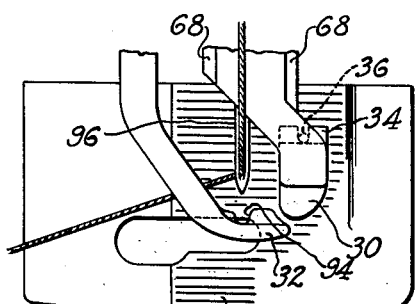
Fig. 15 is a plan on an enlarged scale of the work clamping members of the machine shown in relation to the needle at the beginning of an upper tensioning operation.
Figure 16:
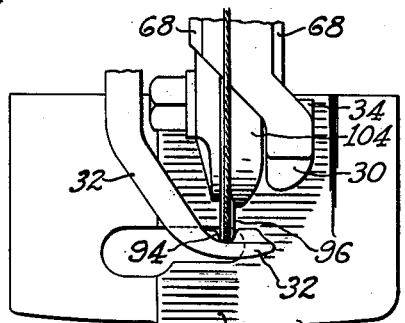
Fig. 16 is a similar view of the same parts after the upper tensioning operation is completed.

Referring to Figs. 15 and 16, it is apparent that as the lasting finger, in its forward position of Fig. 15, moves downwardly into clamping engagement with the outturned upper flange, it is clamped firmly against the extension sole and work support. In moving from its forward position to its rearward position, shown in Fig. 16, the lasting finger tensions the upper by drawing it through an angle about the forward end of the presser foot 32 (see Figs. 4 and 6), the presser foot also holding the shoe from rearward movement with the lasting finger by engagement with the bulging last supported surface of the upper at all times.

To assist in the tensioning action of the illustrated lasting finger, the lower end of the finger has a dovetail slot receiving a correspondingly shaped rib on a plate 34. The plate 34 has a series of rearwardly inclined teeth along its bottom surface running in the direction of the seam line and is retained in position against movement along the retaining slot, which extends along the seam line, by a spring wire 36 secured to the lasting finger with its lower end engaging notches in the rearward edge of the plate and the lasting finger.

Figure 4:
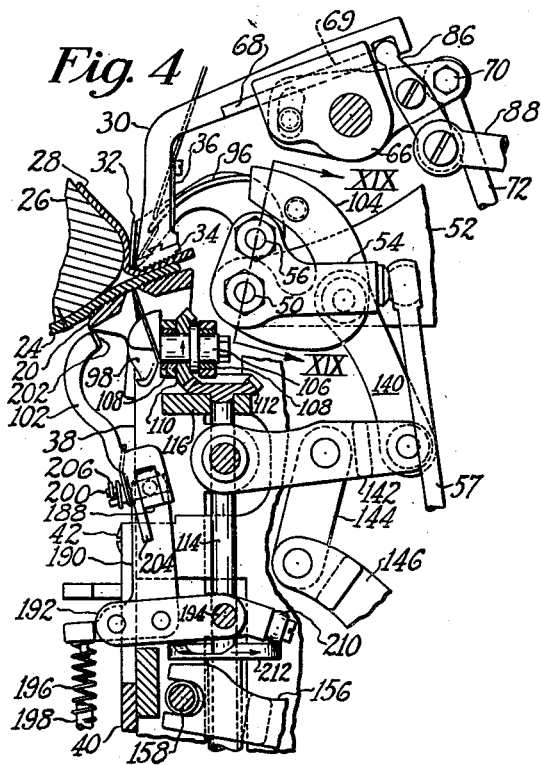
Fig. 4 is a sectional view in side elevation of the same parts in the same positions.
Figure 5:
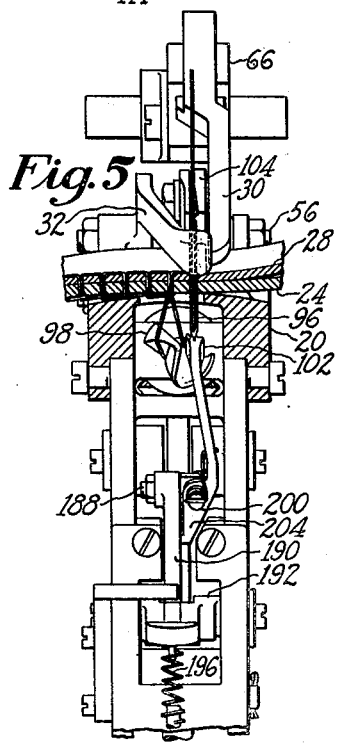
Fig. 5 is a view similar to that of Fig. 3 taken after an upper tensioning operation is completed and the corresponding sewing cycle is started, the sewing needle having just penetrated the work.
Figure 6:
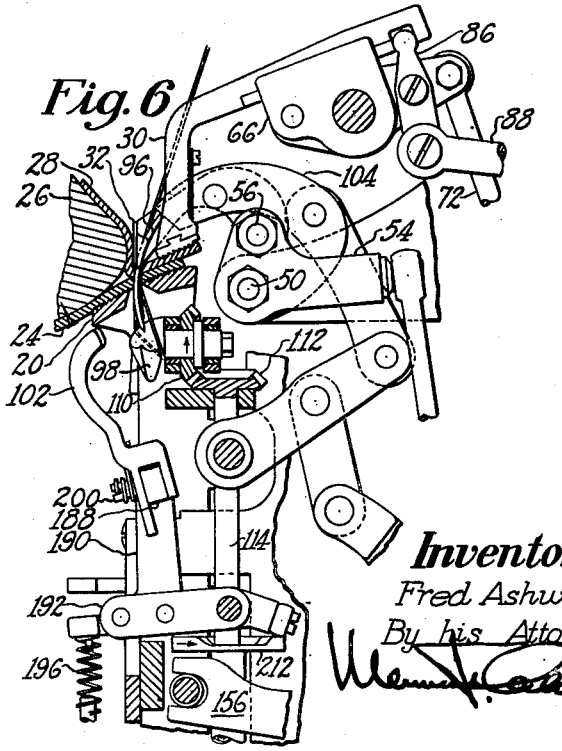
Fig. 6 is a view in side sectional elevation of the same parts in the same positions.
Figure 7:
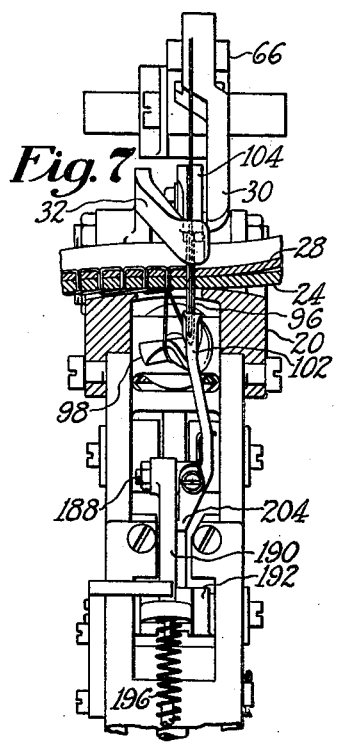
Fig. 7 is a view in front sectional elevation of the operating parts of the machine taken after the needle has partly retracted.
Figure 8:
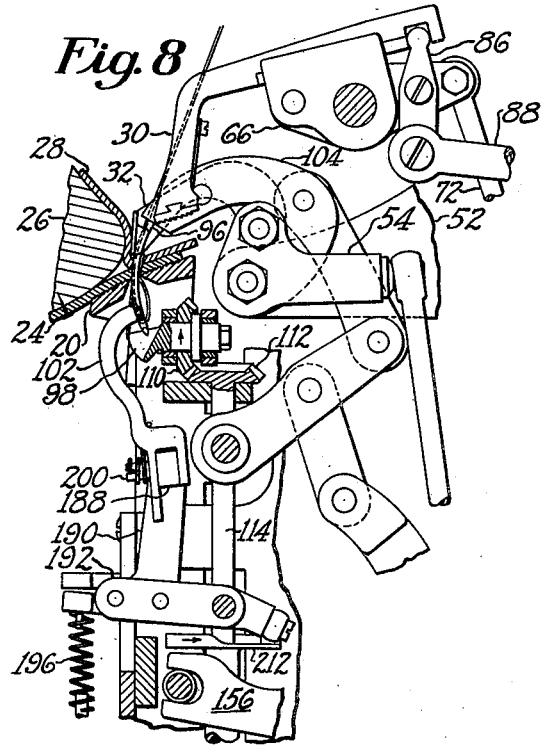
Fig. 8 is a view in right side elevation of the same parts in the same positions.
Figure 9:
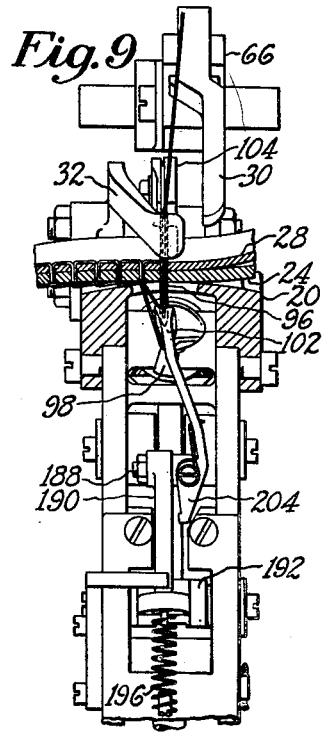
Fig. 9 is a view in front sectional elevation showing the continued retracting movement of the needle and the beak of the chain forming looper entering a loop of thread carried by the needle.
Figure 10:
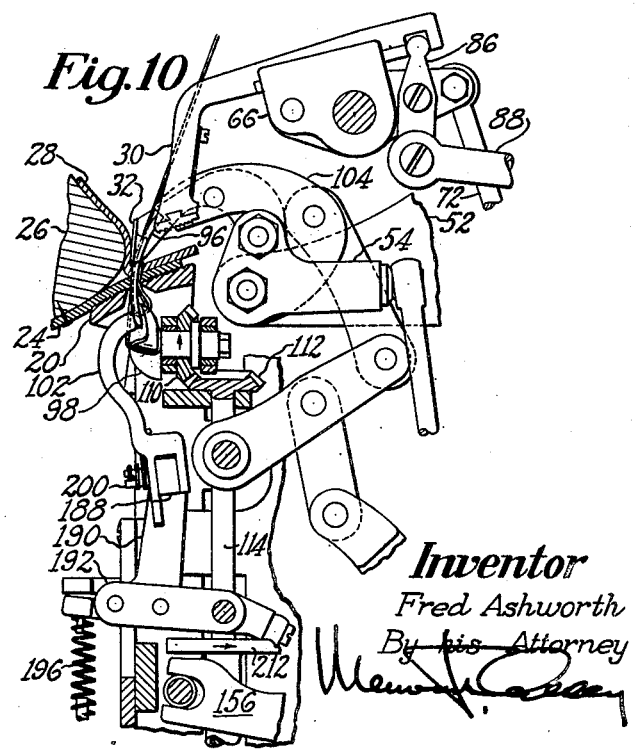
Fig. 10 is a view in right side sectional elevation of the same parts in the same positions.

The lasting finger 30 of the present machine is mounted for vertical movement toward and from the upper and for rearward movement transversely to the line of operation of the stitch forming devices to tension the upper. In tensioning the upper a snubbing action takes place through the angle in the upper formed by the presser foot as illustrated in Fig. 4; the presser foot not clamping the work rigidly but being in slightly raised position while engaging the work. As the lasting finger is completing its tensioning action the presser foot is forced more deeply into the angle in the upper between its outturned flange and its bulging last supported surface until finally the position of Fig. 6 is reached where a maximum tension is imparted to the upper. During the transition from Fig. 4 to Fig. 6 there is a certain amount of slippage beneath the lasting finger, the upper eventually being clamped against the extension of the sole between the presser foot and the work support. When the presser foot reaches the limit of its work clamping movement the work support is depressed somewhat until nearly all the pressure of the lasting finger on the outturned upper is relieved. The lasting finger also is raised at about the same time. When the lasting finger re-engages the upper it, in turn, tends to take up the pressure of the work support and relieve the pressure on the presser foot. In this way the pressure of the work support is transferred alternately between the lasting finger and the presser foot.

To enable transfer of clamping pressure alternately between the lasting finger and the presser foot, the work support is slidingly mounted in the machine frame in a manner similar to that disclosed in the Morrill application and is raised yieldingly into engagement with the sole of the shoe. When either the presser foot or the lasting finger is moved against the upper, it disengages the upper from the clamping force of the other.

As in the machine of the above noted patent the work support is provided with an open framed shank 38 secured at its upper end to the work support, which is in the form of an inverted U bolted to the sides of the shank. The work support shank is slidingly mounted in a guideway in the machine frame and is retained in place by a vertical cap plate 40 (Fig. 1) having perforations to receive screws 42 threaded into the machine frame. The lower end of the shank has a plate portion from which a rod 44 projects downwardly and is slidably engaged in an opening in a bracket 46 clamped to the machine frame. The means for raising the work support yieldingly consists of a compression spring 48 coiled about the rod 44 between the shank of the work support and the bracket 46.

The presser foot 32, instead of being mounted for movement through an arc of greater radius than that of the needle and instead of being fixed relatively to the point of operation of the needle along the line of the seam as in the machine of the patent, is mounted in the illustrated machine to move toward and from the work through a curved path concentric with the needle and is arranged to move with the needle to assist in feeding the work. The presser foot is in the form of a C-shaped arm bent into the line of feed at its forward end and secured at its rearward end to the left end of a horizontal stud 50 (see particularly Fig. 19). The stud 50 rotates in a sleeve bearing portion of a feed lever 52 arranged for movement back and forth in the direction of work feed.

To actuate the presser foot toward and from the shoe there is connected to the right end of the stud 50 an arm 54 secured to the presser foot by a bolt 56 extending across the upper surface of the feed lever. At the rearward end of the arm 54 is a spherical enlargement surrounded by a socket in a link 57 extending downwardly with its lower end having a similar socket surrounding an enlargement on the outer end of a cam lever 58 (see Fig. 1) fulcrumed on a horizontal shaft 60. The cam lever 58 has a roll 62 engaging a slot in a cam disc secured to a main operating and sewing shaft 64 rotatably mounted in the machine frame.

The mounting for the lasting finger 30 comprises a carrier 66 for moving the lasting finger toward and from the shoe upper. The carrier is fulcrumed on a shaft 67. The lasting finger is constructed with a generally L-shaped form with side ribs 68 engaging grooves of a guideway 69 in the carrier 66. Movement of the lasting finger along the guideway in the carrier causes it to be actuated transversely to the line of feed of the stitch forming devices.

For actuating the lasting finger carrier 66 to cause the lasting finger to clamp and release the shoe, a rearwardly projecting arm of the carrier has a pivotal connection 70 with the upper end of a link 72, the lower end of which is pivotally connected at 74 with a rearwardly extending arm of an intermediate lever 76. The lever 76 swings loosely on a fulcrum shaft 78 secured in the machine frame and has at its lower end a number of teeth engaging notches in the hub of a cam lever 80 fulcrumed on a horizontal shaft 82. The cam lever 80 has a roll 84 engaging a slot in a cam on the sewing shaft 64.

To actuate the lasting finger with a lasting motion transversely to the line of feed, a mechanism is provided separate from that employed to actuate the lasting finger carrier toward and from shoe clamping position. The mechanism for actuating the lasting finger transversely to the line of feed comprises a short lever 86 fulcrumed on the rearwardly extending arm of the lasting finger carrier 66 and formed with a rounded upper end engaging a notch in the rearward end of the lasting finger. The lower arm of the short lever 86 is pivotally connected to the forward end of a link 88 similarly connected at its rearward end to a cam lever 90 fulcrumed in turn on the shaft 78. The lower arm of the cam lever 90 has a roll 92 engaging a cam on the cam shaft 64.

As the needle starts to penetrate a shoe, both the presser foot and lasting finger are in their work engaging positions within the angle of the shoe upper formed thereby, the presser foot being slightly raised and engaging the upper between the needle and the bulging last supported surface of the upper. The lasting finger, however, is in its lowered work clamping position. To prevent displacement of the needle either in the direction of work feed or toward the bulging upper surface of the shoe, the presser foot extends in both directions along the seam line from the needle and has a needle guiding recess 94, best shown in Fig. 15. The inner surface of the recess 94 closely surrounds the needle without restricting movement of thread through the needle eye. After the needle engages the shoe, the shoe is fed a stitch length, the presser foot being raised. After the feeding movement of the needle, the presser foot is actuated a second time to clamp the upper against the sole of the shoe. The lasting finger also is raised during the feeding movement of the needle.

Figure 19:
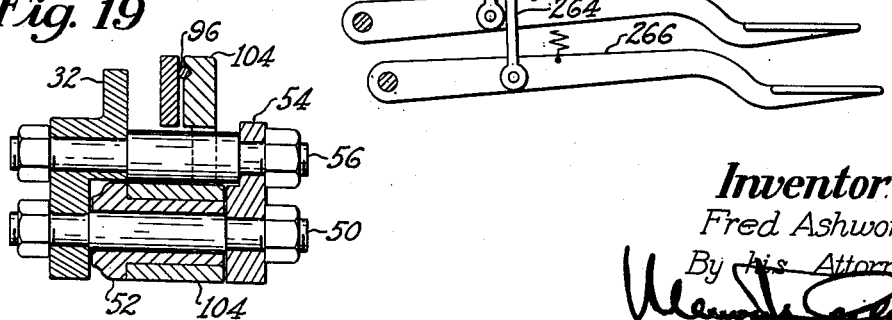
Fig. 19 is a slightly enlarged sectional detail view taken on line XIX—XIX of Fig. 4, illustrating the construction of the presser foot and needle segment bearings.

The stitch forming devices of the machine besides the curved eye-pointed needle, indicated at 96, include a rotary loop taker or looper 98, a take-up 100 and a loop former 102 arranged to engage the needle yieldingly outside its arc of curvature while the needle is being retracted from the work to press the thread through the needle eye into the path of the loop taker. The needle, as in the machine of the Morrill patent, is clamped within a segment 104 rotatably mounted on a sleeve portion of the feed lever 52 in which the stud 50 is rotatably mounted (Fig. 19). The segment 104 thus is disposed between the presser foot 32 and the arm 54 connected to it. The segment is cut away between its outer radius and its hub to clear the bolt 56 which connects the presser foot with its actuating arm. The presser foot and the needle segment, both being rotatable about the stud 50, they move together with the feed lever to feed the shoe and the needle engages the work during their feeding movement to provide a secure purchase on the shoe.

The loop taker 98 is in the form of a Wilcox and Gibbs type continuously rotating whirl formed integrally with a rearwardly projecting stud 106 supported in bearings 108 carried by the shank of the work support. Between the bearings 108 on the stud 106 is fixed a bevel gear 110 meshing with a corresponding gear 112 secured to the upper end of a vertical shaft 114 rotating in bearings in a strut 116 in the work support shank and in the lower plate portion of the shank. To prevent vertical displacement of the shaft 114 the undersurface of the bevel gear 112 engages the strut 116 and the lower plate of the shank is engaged by a collar 118 pinned to the shaft.

To enable the work support to be raised and lowered without interfering with the rotation of the loop taker 98 the shaft 114 telescopes with an alined shaft 120 rotatably mounted in a bearing 122 in the machine frame. The shaft 120 is larger in diameter than the shaft 114 and has a central passage within which the smaller shaft slides, a shoulder on the shaft 120 retaining that shaft from axial movement in the bearing 122. The shaft 114 has a diametric pin 124 engaging a pair of slots in the shaft 120, one of which slots is illustrated at 126, Fig. 1. The lower end of the shaft 120 has pinned to it a bevel gear 128 meshing with a similar gear 130 pinned to a horizontal shaft 132 supported in a bearing in the frame. The rearward end of the shaft 132 has a diametric key portion engaging a slot in the end of a horizontal drive shaft 134. The drive shaft is supported in the machine frame and carries a helical gear 136 by means of which a second helical gear 138 meshing therewith rotates the main sewing shaft 64.

The loop taker 98 acts within the arc of needle curvature to enter the loop of thread formed by the needle and to enchain it with the previously formed loop which is retained by the loop taker from the previous sewing cycle. In order to insure that the relationship between the loop taker and the needle will be maintained uniform regardless of the raising and lowering movement of the work support as the thickness of the work changes, the mechanism for actuating the needle toward and from the work is connected to the work support in a manner described in the Morrill patent, above noted. This mechanism briefly comprises a link 140 pivotally connected to the needle segment, a floating lever 142 connected at its rearward end to the link 140 and pivotally connected at its forward end with the work support and a link 144 pivotally connected to a mid point on the floating lever 142 and to the forward end of a cam lever 146 rotatable on the fulcrum shaft 78. The cam lever 146 carries a cam roll 148 engaging a cam on the sewing shaft 64.

For actuating the feed lever 52 the lever is mounted to swing on a vertical pin 150 secured in the frame of the machine and a rearwardly extending arm of the feed lever is connected by a link 152 to an arm of a cam lever 154 actuated by a cam on the sewing shaft 64, as described more fully in the Morrill patent.

To prevent the work support from pressing the shoe against either the presser foot or the lasting finger during work feed in a manner to obstruct the feeding movement, the work support is locked at this time in each sewing cycle. The work support lock is of the same construction as in the Morrill patent and is connected to the shank of the work support by a lever 156 having a forward slotted arm embracing a pin 158 in the work support shank. The rearward arm of the lever 156 is connected to a rectangular bar 159 forming the movable member of the lock which is engaged by a series of rolls 160 actuated by a cam lever 162 to grip the bar.

Figure 2:
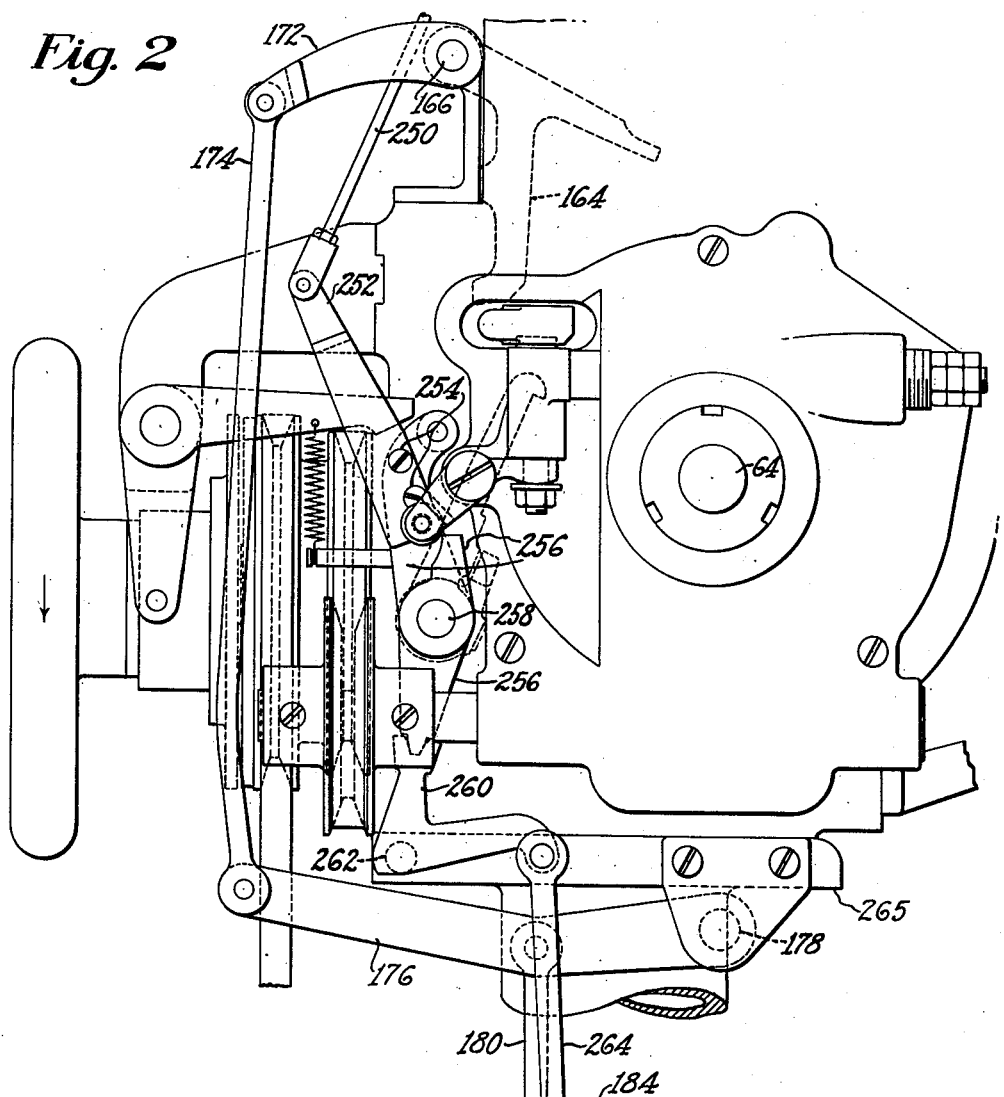
Fig. 2 is a view in left side elevation of the rearward left lower portion of the machine together with an illustration of the control treadles therefor on a somewhat reduced scale.

Upon introduction of an unlasted shoe in the machine the outturned flange of the upper and the extension of the sole are presented between the lasting members, the work support being lowered to facilitate entry of the parts beneath the presser foot and lasting finger. The work support is lowered by the operator, the work support lock first being released and the work support then being pressed downwardly against its raising spring 48. To release the lock the cam lever 162 has a rearwardly projecting lug arranged to be engaged by a cam surface on a lever 164 secured to a shaft 166 rotatable within the machine frame. Engagement of the lever 164 with the cam lever 162 stretches an actuating spring 168 for the cam lever 162 and releases the rolls 160 from the bar 159. A forward projection of the arm of the lever 164 engages a pin 170 on the lever 156 raising the rearward end of the lever 156 and depressing the forward work support engaging end. To actuate the lever 164 the shaft 166 has secured to it an arm 172 pivotally connected to the upper end of a link 174, the lower end of which is connected to a treadle actuated lever 176 (see Fig. 2). The lever 176 is fulcrumed at 178 on the frame of the machine and has a pivotal connection with a treadle rod 180 connected at its lower end with a treadle 182. To maintain the treadle 182 in normal raised position it has a spring 184 stretched between it and a stationary part. The treadle 182 is provided with an adjustable stop screw 186 engaging an under surface of the machine frame to regulate its raised position.

Figure 3:
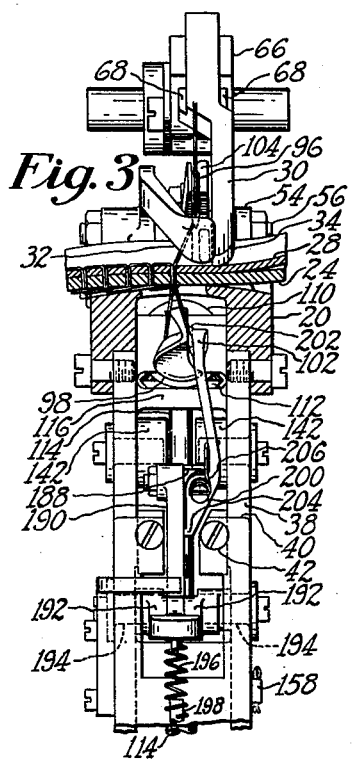
Fig. 3 is a front sectional view on a slightly enlarged scale taken through the sewing point of the machine of Figs. 1 and 2, including only those parts located about the sewing point and indicating the positions of the parts before each upper tensioning and stitch forming cycle of operation is started.

The loop former 102, in its illustrated construction, is particularly well-fitted for cooperation with the work clamping and lasting members and the stitch forming devices employed in the machine of the present invention. The loop former comprises an arm curved rearwardly at its upper end and at its lower end is pivotally mounted in the eye of an eye-bolt 188. The eye-bolt is fixedly clamped in an upwardly extending arm 190 secured by rivets between the sides of a forked lever 192 rotatably mounted on studs 194 projecting inwardly from the sides of the work support shank (see Figs. 3 and 4). To maintain the loop former yieldingly in engagement with the needle during its retracting stroke, the arm 190 has a forwardly projecting lug engaged by a spring 196 supported on a rod 198 secured in the lower plate portion of the work support shank 38, the spring being compressed between a collar 199 on the rod and the lug on the arm 190.

Figure 17:
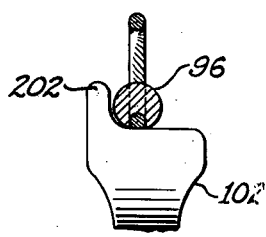
Fig. 17 is a detail view on a still further enlarged scale of the needle and its loop former and guide employed in the machine.

To enable the loop former to follow the needle during work feeding movements, the pivotal mounting for the loop former on the eye-bolt 188 consists of a stud 200 fixed in the eye-bolt. The loop former is provided at its upper end with a flange 202 (see Fig. 17) engaged by the left side of the needle during work feed. To insure a proper fixed location of the loop former along the line of feed, so that it will engage the needle after the needle penetrates the work and during feeding movement of the needle, the loop former has a downwardly extending finger 204 bearing against the right side of the arm 190. For retaining the loop former yieldingly in a position with the finger 204 in contact with the arm 190, the stud 200 projects forwardly from the loop former and has coiled about it a spring 206 hooked around the left side of the loop former at one end and entering a slot in the stud 200 at its other end. The right side of the arm 190 provides an effective stop engaged by the finger 204 to locate the looper in its proper needle engaging position. After the loop former serves its purpose during the retracting movement of the needle from the shoe and the thread has been pressed through the needle eye into the path of the loop taker, the loop former is actuated forwardly away from the needle into a position where loops carried by the loop taker may be enchained without interference from the loop former. For this purpose the arm 190 swings with the loop former about the studs 194.

To actuate the loop former against the force of the spring 206 away from the needle, the lever 192 has threaded into its rearward end a shoulder screw 208 about which is rotatable a roll 210 having a spherical surface engaging a face cam 212 secured to the loop taker rotating shaft 114. The shape of the cam 212 is such that the loop former is actuated away from engagement with the needle forwardly of the machine after the loop taker enters the needle loop in a sewing cycle. For easy assembly and adjustment the cam 212 has an elongated hub terminating at its lower end in a collar portion provided with a setscrew 213 to clamp it in place on the looper drive shaft 114.

The take-up 100 is illustrated in Fig. 1 and consists of a horizontal slide from the right side of which projects a perforated plate portion for engaging the thread. The slide of the take-up is mounted in a guideway provided in a bracket 215 on the machine frame and covered by a pair of plates 214 secured in parallel relation to the bracket. At the rearward ends of the plates 214 is secured an arm 216 on which is rotatably mounted a thread guiding pulley 218. At the forward ends of the plates 214 is a cross bar 220 secured to the bracket 215 and provided with a horizontal arm projecting rearwardly through the perforation in the thread engaging plate of the take-up. In parallel relation to the horizontal arm that is secured to the cross bar 220 is a leaf spring 222, between which and a hooked end of the horizontal arm the thread passes to cause the thread to be frictionally wedged in a manner more fully disclosed in United States Letters Patent 1,864,510, granted June 21, 1932, upon application of Bernard T. Leveque. The thread engaging portion of the take-up gives up and takes up the thread guided over rolls 224, 226 mounted on the bracket 215 at locations above and below the take-up.

To actuate the take-up slide its rearward end is pivotally connected at 228 with a forked link 230, which link is also pivotally connected to the upper end of a lever 232 fulcrumed on a shaft 234 fixed in the machine frame. The lever 232 in turn is connected at its lower end with one of a pair of toggle links 236 and 238, the link 238 being pivoted to a lug 240 projecting inwardly from the frame of the machine. The central joint of the toggle links 236 and 238 is connected to a vertical link 242, in turn connected to the cam lever 146 which also actuates the needle.

The sewing thread tension is similar to that disclosed in United States Letters Patent No. 2,384,488, granted September 11, 1945, upon application of Thomas F. Orr and Leonard S. Curtin. This thread tension comprises a thread engaging wheel 244 rotating on a shaft 246. For rotating the wheel 244 to provide an extra supply of thread at the beginning of a seam a pawl 248 is rotatably mounted on the shaft 246 and engages ratchet teeth on the wheel. To actuate the pawl 248 it has an upwardly extending arm connected to it having a pivotal connection with a link 250, in turn pivotally connected to an arm 252 forming a part of a driving and stopping mechanism for the machine. The arm 252 is secured by screws 254 (see Fig. 2) to a control lever 256 secured to a horizontal rockshaft 258. A downwardly extending arm of the control lever has a projection entering a notch in an arm of a treadle actuated bell crank 260 having a pivot 262 projecting therefrom and a connection with a treadle rod 264 to the lower end of which a starting and stopping treadle 266 is connected. The pivot 262 is rotatable in a bar 265 secured to the machine frame. The driving and stopping mechanism and the control connections thus briefly referred to are otherwise of the same construction and mode of operation as those disclosed in the Morrill patent. Depressing the treadle 266 causes rotation of the main drive shaft 134 or releasing it brings the shaft to rest in a predetermined position with the needle disengaged from the work with the loop of thread in the last formed stitch surrounding the loop taker 98. Upon downward movement of the work support depressing treadle 182 the shoe is freed from the clamping action of the lasting finger and the work support and if the thread is severed on the loop taker, the severed end will be drawn through the loop of thread in the previously formed stitch to lock the end of the seam thus completed from accidental unraveling.

Figure 18:
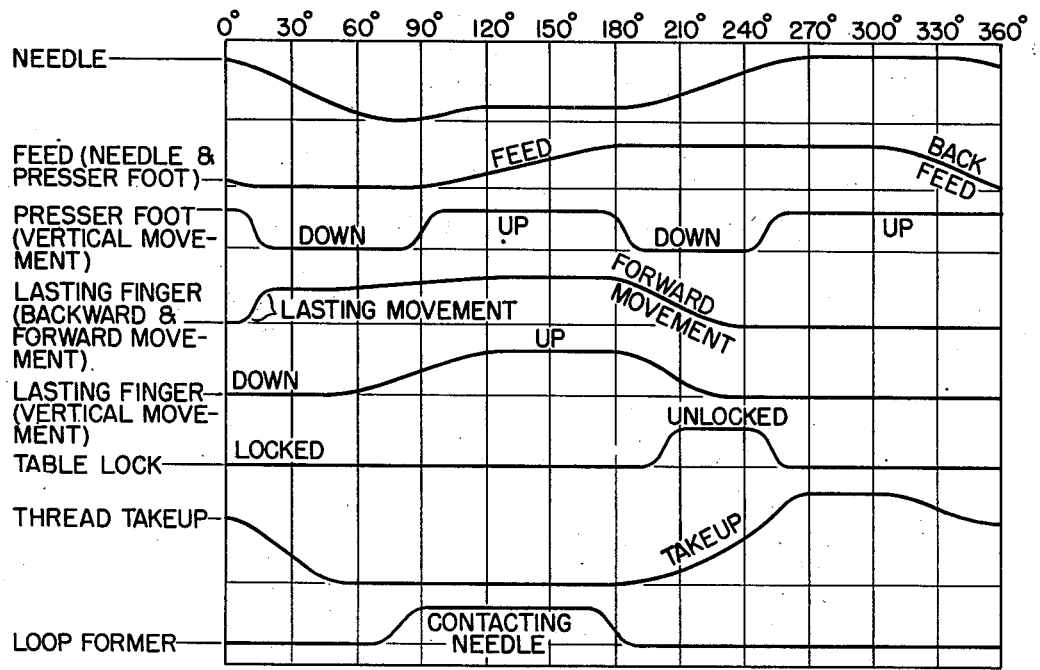
Fig. 18 is a time chart illustrating the operation of the various parts.

As best shown in Fig. 18, the presser foot acts with the needle to feed the work, the work support being locked, as indicated by the line labeled "Table Lock," while the needle is penetrating the shoe parts. After the needle has penetrated the shoe parts the presser foot moves upwardly to disengage the shoe. At the same time the lasting finger also disengages the shoe, the work support being still locked and the shoe being free to move in the direction of feed with the needle. At the end of the feeding movement of the needle the presser foot is actuated to a "down" position the second time in the sewing cycle to clamp the upper and extension sole. After clamping movement of the presser foot the work support is unlocked so that it engages the sole 24 with a yielding pressure. During this time the lasting finger moves downwardly to a shoe clamping position and the presser foot is again raised. The operation of the lasting finger in tensioning the uper is then repeated in preparation for the succeeding sewing cycle.

The nature and scope of the invention having been indicated and a particular embodiment having been described what is claimed is:

1. A stitchdown lasting machine having fastening devices and clamping members comprising a work support, a lasting finger acting on the outturned flange of a shoe upper on a last, and a presser foot located between the lasting finger and the bulging last supported surface of the upper to form an angle in the upper between its outturned flange and its bulging surface, in combination with mechanism for actuating the lasting finger transversely to the line of operation of the fastening devices timed to tension the upper through an angle in the upper while the presser foot presses the upper more deeply into angular form and the fastening devices are disengaged from the upper.

2. A stitchdown lasting machine having fastening devices and clamping members comprising a work support, a lasting finger acting on the outturned flange of a shoe upper on a last, and a presser foot located between the lasting finger and the bulging last supported surface of the upper to form an angle in the upper between its outturned flange and its bulging surface, in combination with mechanism for actuating the lasting finger transversely to the line of operation of the fastening devices to tension the upper through an angle formed in the upper by the presser foot, and mechanism for forcing the presser foot more deeply into the angle timed to act during the tensioning action of the lasting finger.

3. A stitchdown lasting machine having fastening devices and clamping members comprising a work support, a lasting finger acting on the outturned flange of a shoe upper on a last, and a presser foot located between the lasting finger and the bulging last supported surface of the upper to form an angle in the upper between its outturned flange and its bulging surface, in combination with mechanism for actuating the lasting finger transversely to the line of operation of the fastening devices to tension the upper through an angle formed in the upper by the presser foot, mechanism for forcing the presser foot more deeply into the angle during the tensioning action of the lasting finger, and means for raising the work support yieldingly to cause the shoe to be clamped alternately between the lasting finger and the presser foot.

4. A stitchdown thread lasting machine having stitch forming devices including a needle and clamping members comprising a work support, a lasting finger acting on the outturned flange of a shoe upper on a last and a presser foot located between the lasting finger and the bulging last supported surface of the upper to form an angle in the upper between the outturned flange and bulging surface, in combination with mechanism for actuating the lasting finger transversely to the line of operation of the stitch forming devices to tension the upper through an angle formed in the upper by the presser foot, means for raising the work support yieldingly to cause the shoe to be clamped alternately against the lasting finger and presser foot, and a needle guiding surface on the presser foot for preventing displacement of the needle in the direction of work feed.

5. A stitchdown thread lasting machine having stitch forming devices including an eye-pointed needle and clamping members comprising a work support, a lasting finger acting on the outturned flange of a shoe upper on a last and a presser foot located between the lasting finger and the bulging last supported surface of the upper to form an angle in the upper between the outturned flange and bulging surface, in combination with mechanism for actuating the lasting finger transversely to the line of operation of the stitch forming devices to tension the upper through an angle formed in the upper by the presser foot, means for raising the work support yieldingly to cause the shoe to be clamped alternately against the lasting finger and presser foot, a loop taker on the work support, and mechanism connected to the work support for actuating the needle toward and from the work to bring the eye of the needle into uniform relationship with the loop taker as the thickness of the work changes.

6. A stitchdown lasting machine having stitch forming devices including an eye-pointed needle and clamping members comprising a work support, a lasting finger acting on the outturned flange of a shoe upper on a last and a presser foot located between the lasting finger and the bulging last supported surface of the upper to form an angle in the upper between its outturned flange and its bulging surface, in combination with mechanism for actuating the lasting finger transversely to the line of operation of the fastening devices to tension the upper through an angle formed in the upper by the presser foot, a loop taker mounted for rotation on the work support, means for raising the work support to cause the shoe to be clamped alternately by the lasting finger and the presser foot, mechanism connected to the work support for actuating the needle toward and from the work to bring the eye of the needle into uniform relationship with the loop taker as the thickness of the work changes, and mechanism for driving the loop taker including telescoping shafts disposed to slide relatively to each other as the work support is raised or lowered.

7. A stitchdown thread lasting machine having stitch forming devices including a work penetrating and feeding needle and clamping members comprising a work support, a lasting finger acting on the outturned flange of a shoe upper on a last and a presser foot located between the lasting finger and the last supported bulging upper surface, in combination with mechanism for actuating the presser foot to clamp the upper in each sewing cycle after the lasting finger has tensioned the upper and thereafter to release the upper during feeding movement of the needle and a second time to clamp the upper after the feeding movement of the needle is completed.

8. A stitchdown thread lasting machine having stitch forming devices including a work penetrating and feeding needle and clamping members comprising a work support, a lasting finger acting on the outturned flange of a shoe upper on a last and a presser foot located between the lasting finger and the last supported bulging upper surface, in combination with mechanism for actuating the presser foot to clamp the upper in each sewing cycle after the lasting finger has tensioned the upper and thereafter to release the upper during feeding movement of the needle and a second time to clamp the upper after the feeding movement of the needle is completed, means for raising the work support yieldingly to cause the shoe to be clamped alternately by the lasting finger and the presser foot, and a lock to prevent movement of the work support during feeding movement of the needle.

9. A stitchdown thread lasting machine having stitch forming devices including a work penetrating and feeding needle and clamping members comprising a work support, a lasting finger acting on the outturned flange of a shoe upper on a last and a presser foot located between the lasting finger and the last supported bulging upper surface, in combination with mechanism for actuating the presser foot to clamp the upper in each sewing cycle after the lasting finger has tensioned the upper and thereafter to release the upper during feeding movement of the needle and a second time to clamp the upper after the feeding movement of the needle is completed, means for raising the work support yieldingly to cause the shoe to be clamped alternately by the lasting finger and the presser foot, a lock to prevent movement of the work support during feeding movement of the needle, and mechanism for actuating the lock to release the work support for yielding clamping movement while the presser foot is actuated the second time in each sewing cycle to clamp the upper.

10. A stitchdown thread lasting machine having stitch forming devices including an eye-pointed needle and clamping members comprising a work support, a lasting finger acting on the outturned flange of a shoe upper on a last and a presser foot located between the needle and the bulging last supported surface of the upper to form an angle in the upper between its outturned flange and its bulging surface, in combination with a loop taker at the side of the work with the work support, and means engaging the needle at the side of the work with the work support while the needle is being retracted to press the thread through the needle eye into the path of the loop taker.

11. A stitchdown thread lasting machine having stitch forming devices including a curved eye-pointed needle and clamping members comprising a work support, a lasting finger acting on the outturned flange of a shoe upper on a last and a presser foot located between the lasting finger and the bulging last supported surface of the upper to form an angle in the upper between its outturned flange and its bulging surface, in combination with a loop taker at the side of the work with the work support acting within the curvature of the needle to enter the loop of thread carried thereby, and means engaging the needle outside its curvature while being retracted from the work to press the thread through the needle eye into the path of the loop taker.

12. A stitchdown thread lasting machine having stitch forming devices including an eye-pointed work feeding needle and clamping members comprising a work support, a lasting finger acting on the outturned flange of a shoe upper on a last and a presser foot located between the needle and the bulging last supported surface of the upper, in combination with a loop taker at the side of the work with the work support, a yieldingly actuating loop former engaging the needle while the needle is being retracted from the work to press the thread through the needle eye into the path of the loop taker, and means for causing the loop former to follow the needle during its feeding movement.

13. A stitchdown thread lasting machine having stitch forming devices including an eye-pointed work feeding needle and clamping members comprising a work support, a lasting finger acting on the outturned flange of a shoe upper on a last and a presser foot located between the needle and the bulging last supported surface of the upper, in combination with a loop taker at the side of the work with the work support, a yieldingly actuating loop former engaging the needle while the needle is being retracted from the work to press the thread through the needle eye into the path of the loop taker, said loop former having a flange to cause it to follow with the needle during its work feeding movement, a stop for locating the loop former at a fixed position before the needle starts its feeding movement, and yielding means for retaining the loop former in its fixed position against the stop.

14. A stitchdown thread lasting machine having stitch forming devices including an eye-pointed needle and clamping members comprising a work support, a lasting finger acting on the outturned flange of a shoe upper on a last and a presser foot located between the needle and the bulging last supported surface of the upper to form an angle in the upper between its outturned flange and its bulging surface, in combination with a loop taker at the side of the work with the work support, means engaging the needle at the side of the work with the work support while the needle is being retracted to press the thread through the needle eye into the path of the loop taker, and mechanism for disengaging the needle engaging means from the needle after the loop taker enters the needle loop.

15. A stitchdown thread lasting machine having stitch forming devices including an eye-pointed needle and clamping members comprising a work support, a lasting finger acting on the outturned flange of a shoe upper on a last and a presser foot located between the needle and the bulging last supported surface of the upper to form an angle in the upper between its outturned flange and its bulging surface, in combination with a loop taker at the side of the work with the work support, a drive shaft for the loop taker, a loop former engaging the needle while being retracted from the work to press the thread through the needle eye into the path of the loop taker, and a cam on the loop taker drive shaft for actuating the loop former away from the needle after the loop taker enters the needle loop.

16. A stitchdown lasting machine having fastening devices and clamping members comprising a work support, a lasting finger acting on the outturned flange of a shoe upper on a last and a presser foot located between the lasting finger and the bulging last supported surface of the upper to form an angle in the upper between its outturned flange and its bulging side, in combination with a mounting for the lasting finger, comprising a carrier for moving the lasting finger toward and from the upper, and a guideway on the carrier along which the lasting finger is movable transversely to the line of operation of the fastening devices.

17. A stitchdown lasting machine having fastening devices and clamping members comprising a work support, a lasting finger acting on the outturned flange of a shoe upper on a last and a presser foot located between the lasting finger and the bulging last supported surface of the upper to form an angle in the upper between its outturned flange and its bulging side, in combination with a mounting for the lasting finger, comprising a carrier for moving the lasting finger toward and from the upper, a guideway on the carrier along which the lasting finger is movable transversely to the line of operation of the fastening devices, and separate mechanisms for actuating the carrier and the lasting finger along the guideway to tension the upper about the forward end of the presser foot before the presser foot clamps the work.

18. A stitchdown thread lasting machine having a main frame, stitch forming devices in the frame including an eye-pointed needle, a take-up and clamping members comprising a work support and a presser foot, in combination with mechanism for actuating the needle and take-up comprising toggle links connected between the take-up and the frame, the central joint of which links is actuated to drive the take-up and operating connections between the central joint of the toggle links and the needle.

19. A stitchdown thread lasting machine having a main frame, stitch forming devices in the frame including an eye-pointed needle, a take-up, clamping members comprising a work support and a presser foot, mechanism for actuating the needle toward and from the work, in combination with a pair of toggle links, one of which is connected to the take-up and the other of which is pivoted to the frame and an actuating lever comprising a part of the needle actuating mechanism operatively connected to the central joint of said links and to the needle.

FRED ASHWORTH.

REFERENCES CITED

The following references are of record in the file of this patent:

UNITED STATES PATENTS

| Number | Name | Date |
|---|---|---|
| 1,788,841 | Merrick | Jan. 13, 1931 |
| 1,829,227 | Leveque | Oct. 27, 1931 |
| 1,861,653 | Bates | June 7, 1932 |
| 2,350,267 | Zonis | May 30, 1944 |
| 2,502,629 | Morrill | Apr. 4, 1950 |